United States Patent [19]

Reist

[11] 3,757,514

[45] Sept. 11, 1973

[54] UNIVERSAL LINK CHAIN
[75] Inventor: Walter Reist, Hinwil, Switzerland
[73] Assignee: Ferag AG, Hinwil, Switzerland
[22] Filed: Apr. 24, 1972
[21] Appl. No.: 246,712

[30] Foreign Application Priority Data
Apr. 30, 1971 Switzerland.......................... 6435/71

[52] U.S. Cl................. 59/78, 59/DIG. 1, 74/501 R, F16g/13/20
[58] Field of Search......................... 59/78.1, 80, 82, 59/78, DIG. 1; 254/134.7; 63/4; 74/501 R, 501 P

[56] References Cited
UNITED STATES PATENTS

| 1,058,260 | 4/1913 | Prindle..................................... | 59/78 |
| 1,327,927 | 1/1920 | Schneider................................ | 59/78 |
| 1,695,263 | 12/1928 | Jacques.................................. | 59/78.1 |
| 1,947,113 | 2/1934 | Russell................................... | 59/78 |
| 3,066,501 | 12/1962 | Charles................................... | 59/80 |

FOREIGN PATENTS OR APPLICATIONS

| 410,551 | 10/1966 | Switzerland............................ | 59/78 |

Primary Examiner—Charles W. Lanham
Assistant Examiner—Gene P. Crosby
Attorney—Werner W. Kleeman

[57] ABSTRACT

A universal or ball pivot-link chain composed of chain link elements, each such link element possessing at one end a swivel or ball pivot body mounted at the other end of the directly neighboring chain link element. The swivel or ball pivot body comprises two concentric spherical bearing surfaces possessing different radii of curvature, the bearing surface with the smaller radius of curvature being located forwardly of the bearing surface with the largest radius of curvature in the direction of such neighboring link element.

12 Claims, 7 Drawing Figures

UNIVERSAL LINK CHAIN

BACKGROUND OF THE INVENTION

The present invention relates to a new and improved construction of universal or ball pivot-link chain arrangement composed of chain link elements which at one end possess a ball pivot body mounted in the other end of the directly neighboring chain link element.

In contrast to link chains employed in the drive and conveying art, wherein the link elements are intercoupled with one another by single axis pivots, the universal or ball pivot type of link chains possess the notable advantage that they can be readily interposed in a three-dimensional arrangement. Thus, such type chains can be guided over deflecting rolls whose axes extend in skew relationship with respect to one another or they can be guided through guide tubes which, in turn, possess a three dimensional course. Notwithstanding these notable advantages for the aforementioned fields of use, the universal or ball pivot-link chains heretofore proposed in the art have not found wide acceptance. A number of factors can explain such. Firstly, this is so because the ball joint or pivot consisting of the ball pivot body and the ball socket enclosing such ball pivot body possess disproportionately large dimensions in radial direction in consideration of proper loading of the material. Moreover, a considerable constructional expenditure is required for the assembly of universal type-link chains which adds to the overall cost of the equipment in addition to the fabrication costs which are already quite considerable. By virtue of these circumstances the use of such type link chains for carrying out a thrust or pushing action when employing a guide tube is not absolutely reliable, especially since during a curved course of the guide tube considerable friction forces arise. Therefore, in most situations it is not possible to resort to this mode of operation.

This is true for instance for the state-of-the-art type of universal or ball pivot-link chain disclosed in Swiss patent 410,551. With this chain construction the ball pivot body consists of a spherical or ball segment embodying a semi-sphere which is mounted in a pivot socket formed at the confronting end of the neighboring chain link. During pulling of the chain the spherical segment bears against a pivot bowl snapped into the pivot socket when the pivot body is assembled. This mode of assembly requires the hollow compartment enclosed by the pivot bowl, as viewed in the lengthwise direction of the chain, to be deeper than the corresponding dimension of the pivot body. Hence with regard to the thrust or pushing type of operation of the chain arrangement play is present between the chain links which, when overcome during this mode of operation, results in a shortening of the chain. When this happens the universal or pivot action is of course lost since the joints are only constructed as semi-spherical pivots corresponding to the pivot body which encompasses approximately a semi-sphere. Hence, this type chain construction is not proposed to be used for thrust or pushing type operations and also is not suitable. Of course in an attempt to counter these drawbacks it would be possible to construct the pivot bodies as complete spheres, in which case then the pivot socket would have to be provided with an appropriate spherical counter surface. Yet if this modification is made, it is then at the expense of the contemplated assembly of the pivot bowl constructed as a spring or snap-type ring. While other modes of assembly would be conceivable if there were undertaken an appropriate construction of the pivot socket, still the construction of the pivot body as a complete or full sphere requires considerable radial dimensions. Moreover, during the thrust mode the radial contact forces in the guide tube, particularly if such is curved, are considerable for such complete spherical pivot joints.

SUMMARY OF THE INVENTION

Hence from what has been explained heretofore it should be apparent that the art is still in need of universal or ball pivot type link chain constructions which are not associated with the aforementioned drawbacks and limitations of the state-of-the-art proposals. It is therefore a primary object of the present invention to provide a novel construction of universal link chain which is not associated with the drawbacks and limitations of the prior art as heretofore discussed and which effectively and reliably fulfills the existing need in the art.

Another and more specific object of the present invention relates to a new and improved universal link chain wherein, while maintaining small radial dimensions of the ball pivots, not only can be effectively used during traction or pulling of the chain but also during pushing or thrust operation thereof, and importantly can be advantageously employed in guide tubes while simultaneously reducing frictional forces.

Yet a further significant object of the present invention relates to a novel construction of ball pivot or universal link chain wherein the individual link elements incorporate means permitting use of the chain in both a pulling and pushing mode of operation, the individual link elements are constructed so that they can be easily intercoupled with one another and when desired again disconnected, the fabrication costs of the chain are quite priceworthy, the chain itself requires relatively little maintenance and servicing and is extremely reliable in operation.

Now in order to implement these and still further objects of the invention, which will become more readily apparent as the description proceeds, the inventive universal link chain, also referred to herein as a ball pivot-link chain, is generally manifested by the features that each swivel or ball pivot body comprises two concentric spherical bearing surfaces having different radii of curvature, the bearing surface possessing the smaller radius of curvature being located forwardly or ahead of the bearing surface having the larger radius of curvature as viewed in the direction of the neighboring chain link.

The bearing surface with the larger radius of curvature serves for the pulling or traction operation of the chain, and thus in the description to follow will be conveniently referred to as the traction or pulling surface. In analogous manner the other bearing surface, that is the one with the smaller radius of curvature and serving for the thrust or pushing operation, will be conveniently referred to hereinafter as the thrust or pushing surface. The traction or pulling surface encloses in a ring-like manner the shaft of the associated chain link element; thus it can possess a relatively large radius of curvature and accordingly present a relatively "flat" surface for the traction load. Consequently, lower specific surface compression prevails since the traction surface, owing to its large radius of curvature, exerts practically no bursting or spreading action. On the other hand, the convex or concave thrust or pushing surface can possess a relatively small radius of curvature so that the extension of the pivot body in the lengthwise direction of the chain for a convex thrust or pushing surface is equal to the sum of the radii of curvature and for the case of a concave thrust surface the difference of such radii of curvature. The aforementioned extension is moreover considerably smaller than in the case of a pivot body constructed as a complete sphere, the extension of which in the lengthwise direction of the chain amounts to approximately twice the radius of curvature of the traction surface. Instead of the equally large size radial extension of a pivot body constructed as a complete sphere, with the described arrangement there is a reduction in the corresponding dimension, especially if the swivel or pivot body starting from the region of the traction surface tapers in the direction of the thrust surface. The greatest radial extent of the pivot socket is located at the region of the traction surface. Accordingly, the guiding of the pivot socket in a guide tube is located at the same region and the thrust surface is displaced forwardly with regard to guiding in the thrust or pushing direction. Consequently, the radial component of the thrust force, in the event that two neighboring chain links during the thrust operation are located at an angle with regard to one another, emanates from the center of the thrust surface, and thus is advantageously located at a spacing from the location of the support of the pivot or ball socket in the guide tube. This again brings about a reduction in the surface compression acting between the pivot socket and the guide tube while simultaneously reducing friction and wear.

The end of the chain link possessing the pivot socket and destined to receive the tapering swivel or pivot body can be rendered expandable or spreadable through the provision of slots for instance, so that the chain link elements can be formed of one piece and during assembly simply snapped into one another. In this regard it is also mentioned the chain links preferably possess a rotationally symmetrical shape, simultaneously rendering possible guiding of the chain in tubes or the like and simplifying fabrication.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figures 1, 2:
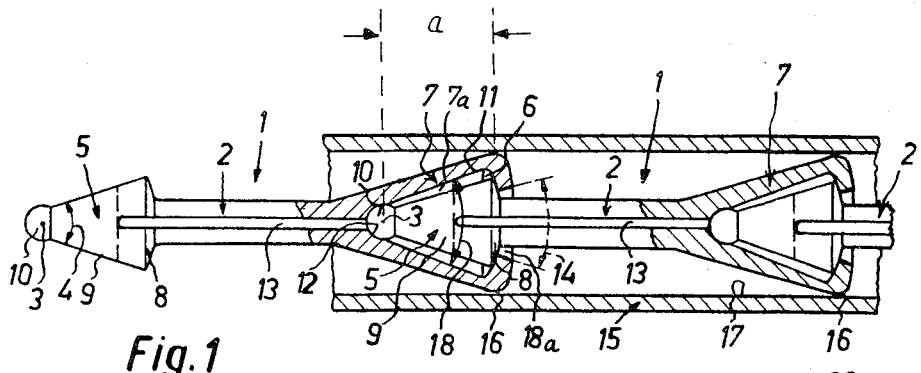
FIG. 1 is a side view, partially in longitudinal section, of a universal or ball pivot chain arrangement designed according to the teachings of the present invention and guided in a tube.
FIG. 2 is a cross-sectional view through a chain similar to the chain construction of FIG. 1, guided in a lengthwise slotted tube, equipped with entrainment means which have been schematically illustrated.

Describing now the drawings, and considering initially the exemplary embodiment of universal or ball pivot-type link chain arrangement as depicted in FIG. 1, it will be seen that such is composed of individual chain links or link elements 1. Each of these chain links or link elements 1 will be understood to comprise a respective swivel or ball pivot body 5, a shaft 2 and a counter bearing or support portion 7 intended to receive the swivel or pivot body 5 of the next successive chain link element 1. The swivel body 5 possesses a substantially spherical-shaped bearing surface 10 and a partial spherical bearing surface 8, both of which exhibit a common center of curvature 3 which, in turn, is located along the lengthwise axis of the chain. Both bearing surfaces 8 and 10 are convex, that is the center of curvature 3 is disposed between both bearing surfaces 8 and 10. Both of these bearing surfaces 8 and 10 are interconnected through the agency of a conical surface 9 which possesses a cone angle or angle of opening 4. It is to be observed that the conical surface 9 does not merge tangentially with the bearing surface 10, rather with a small circle located, with respect to the center of curvature 3, at the same side of the conical surface 9.

A shaft or shaft portion 2 merges with the spherical bearing surface 8, the shape of which is essentially cylindrical. At this essentially cylindrical shaft portion 2 there merges the counter bearing portion 7. A hollow space or compartment 7a is formed at the counter bearing portion 7, which hollow space is essentially delimited by a concave counter bearing surface 12, a conical side wall 11 and a concave counter bearing surface 6. This hollow space 7a is constructed so as to possess approximately the opposite shape of the swivel or pivot body 5, with the exception that the opening or cone angle 18 of the conical side wall 11 is greater than the opening angle 4. The concave counter bearing surfaces 6 and 12 possess practically the same radii of curvature as the bearing surfaces 8 and 10 and likewise possess the same curvature center point 3. An opening 18a leading towards the outside extends from the hollow compartment 7a of the counter bearing portion 7, the diameter of which is greater by a certain amount than that of the shaft portion 2 at the direct neighborhood of the bearing surface 8. The minimum size of this dimension depends upon the difference between the opening angles 18 and 4 and upon the diameter of the shaft portion and is preferably calculated such that with the maximum skew between two link elements [i.e., with a deviation of the lengthwise axis of one link element from the lengthwise axis of the neighboring element through an angle of one-half (angle 18 minus angle 4)] no or only a very small play is present between the external surface of the shaft 2 and the inner edge of the opening 18a.

It is readily possible to calculate the minimum radius of curvature of the course of the chain for the chain arrangement of FIG. 1 from the difference of the cone or opening angles 18 and 4, designated by symbol $\alpha$, as well as from the spacing $s$ between directly successive curvature center points 3. This amounts for instance to the following:

with $s = 60$mm and $\alpha = 8°$ about 860mm,
with $s = 50$mm and $\alpha = 8°$ about 720mm,
with $s = 50$mm and $\alpha = 10°$ about 570mm,
with $s = 40$mm and $\alpha = 8°$ about 580mm,
with $s = 40$mm and $\alpha = 10°$ about 460mm.

Quite generally the minimum radius of curvature of the course of the chain is proportional to the spacing between directly successive curvature center points and inversely proportional to the sign of the angular difference between the angle 18 and the angle 4.

Each of the link elements 1 possesses its greatest diameter at the counter bearing portion 7 which engages about the swivel body 5 of the immediately next successive chain link element. In FIG. 1 this approximately ring-shaped surface has been designated by reference character 16 and is formed to be slightly crowned or bulbous, that is to say it is convex towards the outside. As a result, there is afforded the possibility of guiding the chain in a tube or pipe 15, as illustrated, wherein each link element 1, even with a curved course of the tube 15, only contacts the inner wall 17 of the tube 15 along a line disposed in a plane extending transverse to the lengthwise direction of the tube and is spaced from the center of curvature 3 by the distance or spacing $a$. As a result there is insured for a minimum amount of sliding friction losses and owing to the spherical or bulbous shape of the surface 16 there is not possible clamping or binding of the link elements 1 in the tube 15.

From what has been previously discussed it should be recognized that the universal connection of the link elements of the illustrated chain possess all degrees of freedom of mobility within certain boundary limits, however are free of axial play from one chain link element to the next chain link element. Moreover, the individual link elements can be rotated about their lengthwise axes with regard to one another.

As best illustrated by referring to FIG. 1, the chain link elements are slotted like pliers in their lengthwise direction. In the present case there are provided four such slots, of which however only the slot 13 is visible. The slots 13 each extend in a plane passing through the lengthwise axis of the corresponding chain link element 1 and have a width which is as small as possible. In the lengthwise direction the slots 13 extend through the entire counter bearing portion 7 and through the shaft 2 up to a portion of the swivel or ball pivot body 5. These slots 13 serve the purpose of rendering expansible or spreadable the counter bearing portions 7 so that, as illustrated particularly well in FIG. 3, the swivel body 5 can be introduced without the need of a tool into the counter bearing portion 7 of the neighboring link element.

Of course, the length of the slots 13 depends upon the properties of the material from which the link elements 1 are fabricated and upon the desired degree of spreading of the four flaps into which the counter bearing portion 7 is subdivided by the slots 13 for the purpose of introducing the swivel body 5.

Now in FIG. 2 there is illustrated a cross-sectional view of a chain arrangement guided in a tube or pipe 15. There is visible in section the shaft 2 with the four slots 13, in front view the counter bearing portion 7 with its peripheral surface 16 which is guided at the inner wall 17 of the tube 15. This tube 15 possesses a longitudinal slot 20 through which piercingly extends an entrainment means 21. The entrainment means 21 can be of any optional design and shape, depending upon the purposes which it serves. In FIG. 2 it has been intentionally shown only schematically in order to illustrate that it can be secured at the region of a shaft 2 of a chain link element 1 and extends towards the outside of the tube 15. In FIG. 2 entrainment means 21 is secured by means of a clamping portion 22 to the shaft 2 and the portion of the entrainment means extending towards the outside of the tube 15 has been designated by reference character 23.

Figure 3:
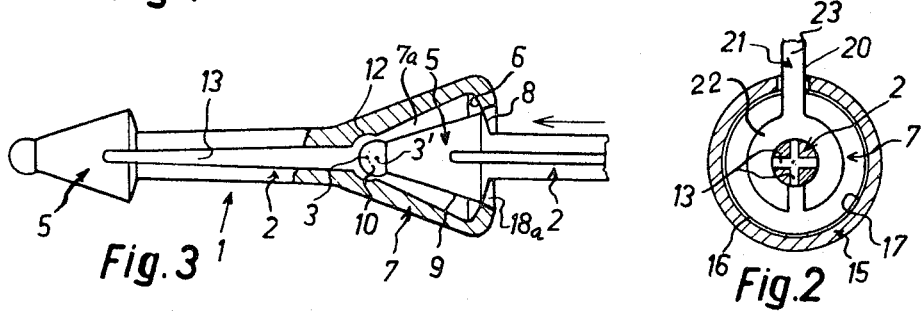
FIG. 3 illustrates a chain link element of the link chain arrangement depicted in FIG. 1 at the moment that it is assembled in the directly neighboring chain link element.

As already mentioned, in FIG. 3 there is represented the assembly of two chain link elements 1. If the swivel body 5 of the link element 1 at the right is displaced in the direction of the arrow into the opening 18a and having the angle of opening 14 of the counter bearing portion 7 of the link element 1 at the left, then the wedge action produced by the conical surface 9 of the swivel body 5 at the right brings about a widening or spreading of this opening 18a. This is possible owing to the provision of the slots 13 discussed above. As soon as the inner width of the widened opening 18a permits the through passage of the swivel body 5 then the counter bearing portion 7 again closes and further displaces the swivel body 5 until the curvature center point 3' of the bearing portion or surface 10 coincides with the curvature center point 3 of the counter bearing surface 12. Consequently, the swivel body 5 is held free of axial play and centered at the counter bearing portion 7.

This joining together or assembly of the link elements which has been brought about by a simple pressure action cannot be rendered retroactive, i.e. inadvertently destroyed because the opening angle of the cone surrounding the bearing surface 8 is much larger than the opening angle of the conical surface 9. Therefore if the universal connection is subjected to tension or pulling, the wedge action emanating from the bearing surface 8 is not sufficient at all in order to again bring about a widening of the counter bearing portion 7 and therefore release of the swivel body 5.

Figure 4:
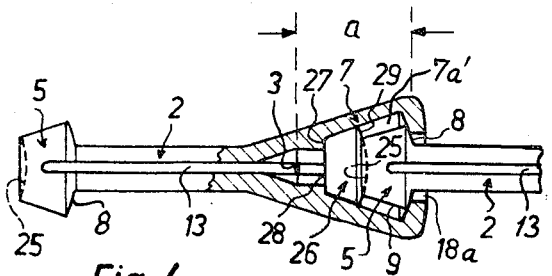
FIG. 4 is a side view, partially in longitudinal section, of a second embodiment of universal link chain as contemplated by this invention.

In FIG. 4 there is illustrated an embodiment of chain construction which is particularly suitable for pressure loads. In this regard it might be mentioned that components of this embodiment which are functionally the same or essentially correspond to those of the prior considered embodiments have been designated with the same reference characters as heretofore used for the chain arrangement of FIG. 1. Thus, there will be recognized the provision of an essentially conical swivel body 5 with its link proximate and spherical zone-shaped bearing surface 8. At the end of the swivel body remote from the link there is again provided a spherical-shaped, however, concave bearing surface 25. The bearing surface 8 and the bearing surface 25 possess, as was the case for the arrangement of FIG. 1, the same center of curvature 3. However, in contrast to FIG. 1, these surfaces are arranged at the same side of such curvature center point 3.

The hollow space 7a of the counter bearing portion 7 is constructed in a different manner for this embodiment. There is provided a substantially ring-shaped planar shoulder 27 against which bears a truncated cone-shaped pressure portion or component 26 with its small base surface 28. The larger "base surface" of this pressure portion 26 is constructed convex and forms a counter bearing surface 29 for the bearing surface 25 of the abutting swivel body 5. This counter bearing surface 29 is likewise spherical and with the curvature center point 3 serving as the center.

Moreover, the pressure portion 26 is seated, with as little as possible radial play in the hollow space 7a' of the counter bearing portion 7, upon the shoulder or projection 27. The largest diameter of the pressure portion 26 corresponds in magnitude to the largest diameter of the swivel body 5 so that with the illustrated one-piece construction of chain link 1 provided with the slots 13 the pressure portion 26 owing to its conical jacket surface also can be pressed through the opening 18a while widening thereof and then into the hollow space or compartment 7a' of the counter bearing portion 7.

The mode of operation of the chain arrangement illustrated in FIG. 4 corresponds during tension load extensively to that of the chain arrangement of FIG. 1. During pressure load, however, with this embodiment the specific surface compression between the bearing surface 25 and the counter bearing surface 29 is smaller than between the bearing surface 10 and the counter bearing surface 12 of the arrangement of FIG. 1. Also with this embodiment there is no longitudinal play present between the individual chain links.

It has already been mentioned that the chain arrangement of this development is particularly suitable for guiding within hollow rails or the like, and specifically in the most simple constructional form, in a tubular or pipe-shaped member.

Figure 5:
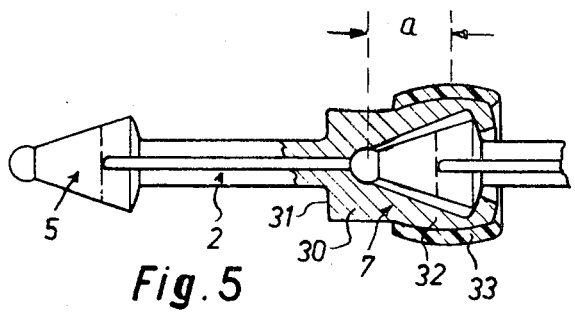
FIG. 5 is a side view, again partially in longitudinal section, of a third embodiment of universal link chain which can be guided without any special lubrication in a hollow rail, especially a tube.

Now in FIG. 5 there is illustrated an embodiment of chain arrangement which is particularly suitable for this purpose. It corresponds essentially to the embodiment of FIG. 1 so that here only the construction thereof which differs from the chain arrangement of FIG. 1 will be considered. This concerns more specifically the external shape of the counter bearing portion 7. Whereas this external shape was approximately conical for the arrangement of FIG. 1, in the arrangement of FIG. 5, it is stepped. Hence it will be seen that an essentially cylindrical section 30 merges initially with the shaft 2 and this cylindrical section 30 has a flat end face 31 which confronts the swivel or pivot body 5 of the chain link and which for instance is intended to be engaged by a sprocket wheel or the like. At the cylindrical section 30 there merges a barrel-shaped section 32 onto which there can be slipped or wound a collar 33, for instance formed of an elastically deformable plastic material or from a self-lubricating bearing material. The outer surface of this collar or sleeve 33 is likewise barrel-shaped. It therefore provides a safeguard that the tube surrounding the chain arrangement will only be contacted by a chain link along a line. Since most plastics possess very small coefficients of friction with regard to metal, the sliding friction losses in the tube are reduced to a minimum without additional lubrication. Finally, the collar 33 additionally functions as a security ring which prevents any undesired widening of the counter bearing portion 7. This is not possible during normal operation of the chain arrangement, as already explained, however with an undesired and irregular kinking or bending of the chain of FIG. 1 could lead to jumping out of the swivel body 5 from the counter bearing portion 7. By using the collar 33 this danger is also eliminated.

Figure 6:
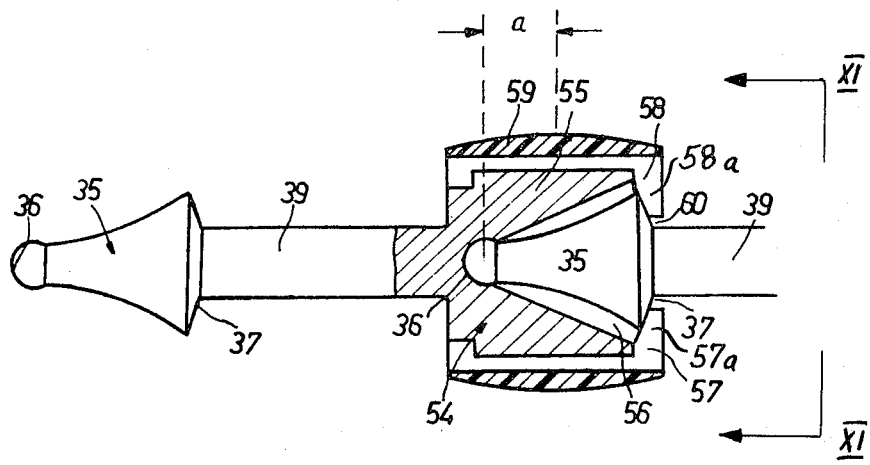
FIG. 6 is a longitudinal sectional view through a chain link element of a modified form of universal link chain.
Figure 7:
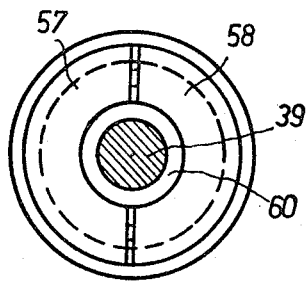
FIG. 7 is a cross-sectional view of the link chain arrangement depicted in FIG. 6, taken substantially along the line XI—XI thereof.

The embodiment of FIGS. 6 and 7 differs from that of FIG. 5 essentially in the features that the counter bearing portion is not elastically expandable or spreadable in order to be able to introduce the swivel body of the next successive chain link. Accordingly, the counter bearing portion, designated in its entirety by reference character 54, is here formed of a total of four components. The first component is a cylindrical extension or projection 55 having an enlarged diameter and which is formed at the shaft 39 of the chain link, this extension or projection 55 possessing a substantially conical bore 56 which opens towards its free end, and the base of which is rounded in accordance with the radius of curvature of the bearing surface 36 at the swivel body 35 of the next following chain link.

This extension or projection 55 is enclosed by a bushing or sleeve consisting of two halves 57 and 58 and which engage behind the projection 55 at its end near to the shaft, as illustrated, and at the end removed from the shaft engages over the projection 55 to such an extent that the opening of the bore 56, with the exception of a throughpassage 60 for the shaft 39 of the next successive chain link, is covered. The inside surfaces of the flaps or tabs 57a and 58a of the bushing halves 57 and 58 respectively and which flaps cover the bore 56 are, as best illustrated in FIG. 6, rounded in concave fashion in accordance with the convex bearing surface 37 of the swivel body 35 of the next successive chain link and serve, on the one hand, therefore as counter bearing surfaces and, on the other hand, to maintain the swivel body 35 of the next successive chain link free of play at the base of the bore 56.

In order that both bushing segments or halves 57 and 58 are supported over the extension or projection 55 there is drawn over such bushing segments a sleeve member 59 which, in the event that it should also simultaneously serve as a guide body in the manner of the collar 33 of the embodiment of FIG. 5, can be formed of plastic or a self-lubricating bearing material.

While there is shown and described present preferred embodiments of the invention, it is to be distinctly understood that the invention is not limited thereto but may be otherwise variously embodied and practiced within the scope of the following claims.

Accordingly what is claimed is:

1. A universal link chain arrangement comprising a plurality of chain link elements, each of said chain link elements possessing at one end a swivel body mounted at the other end of the directly neighboring chain link element, said swivel body possessing two concentric spherical bearing surfaces having different radii of curvature, the bearing surface having the smaller radius of curvature being arranged forwardly of the bearing surface having the larger radius of curvature in the direction of such neighboring chain link element.

2. The link chain arrangement as defined in claim 1, wherein the chain link elements are all essentially of the same shape, a counter bearing portion for each chain link element provided at the other end thereof and capable of receiving the swivel body of the neighboring chain link element, said counter bearing portion including means for enabling elastically widening such counter bearing portion.

3. The link chain arrangement as defined in claim 2, wherein each of the chain link elements is formed of one piece.

4. The link chain arrangement as defined in claim 1, wherein both spherical bearing surfaces of the swivel body are convex.

5. The link chain arrangement as defined in claim 1, wherein the spherical bearing surface having the larger radius of curvature is convex and the spherical bearing surface having the smaller radius of curvature is concave.

6. The link chain arrangement as defined in claim 2, wherein said counter bearing portion is provided at least at two diametrically opposite locations with lengthwise extending slots defining said enabling means.

7. The link chain arrangement as defined in claim 1, wherein each chain link element is enclosed by a component at the location of largest diameter.

8. The link chain arrangement as defined in claim 7, wherein said component is formed of plastic.

9. The link chain arrangement as defined in claim 7, wherein said component is formed of a self-lubricating bearing material.

10. The link chain arrangement as defined in claim 1, further including a counter bearing portion at the other end of each chain link element and composed of a number of parts which enclose a hollow space intended to receive the swivel body of the neighboring chain link element, this hollow space being delimited by counter bearing surfaces for the bearing surfaces of the swivel body.

11. The link chain arrangement as defined in claim 1, further including a hollow guide tube within which travels at least a portion of the link chain arrangement.

12. The link chain arrangement as defined in claim 11, wherein said guide tube is slotted in lengthwise direction, and entrainment means secured to at least a portion of the link chain arrangement, said entrainment means extending towards the outside of said guide tube.

* * * * *